United States Patent
Averbuch

(10) Patent No.: US 9,832,154 B2
(45) Date of Patent: Nov. 28, 2017

(54) ENHANCED USAGE OF BUSINESS INTELLIGENCE SYSTEMS

(75) Inventor: Jakob Averbuch, Natania (IL)

(73) Assignee: Panorama Software Inc., New York, NY (US)

( * ) Notice: Subject to any disclaimer, the term of this patent is extended or adjusted under 35 U.S.C. 154(b) by 538 days.

(21) Appl. No.: 13/067,962

(22) Filed: Jul. 12, 2011

(65) Prior Publication Data
US 2013/0018840 A1    Jan. 17, 2013

(51) Int. Cl.
G06F 17/30    (2006.01)
H04L 12/58    (2006.01)
G06Q 10/00    (2012.01)

(52) U.S. Cl.
CPC ............. *H04L 51/28* (2013.01); *G06Q 10/00* (2013.01); *H04L 51/04* (2013.01); *H04L 51/16* (2013.01)

(58) Field of Classification Search
None
See application file for complete search history.

(56) References Cited

U.S. PATENT DOCUMENTS

| 6,810,394 | B2 | 10/2004 | Coutts et al. |
| 7,360,164 | B2* | 4/2008 | Bjoernsen et al. ........... 715/751 |
| 7,430,709 | B2 | 9/2008 | Cho et al. |
| 7,730,059 | B2* | 6/2010 | Behnen et al. .............. 707/722 |
| 2003/0167281 | A1* | 9/2003 | Cohen et al. ............ 707/103 R |
| 2004/0041843 | A1* | 3/2004 | Cui et al. ...................... 345/810 |
| 2006/0053195 | A1* | 3/2006 | Schneider et al. ............ 709/204 |
| 2007/0300160 | A1* | 12/2007 | Ferrel et al. ................... 715/744 |
| 2008/0015919 | A1* | 1/2008 | Busse et al. ...................... 705/8 |
| 2008/0229213 | A1* | 9/2008 | Hamilton ............... G06Q 10/10 715/751 |
| 2009/0150507 | A1* | 6/2009 | Davis .................. H04L 12/5855 709/207 |
| 2010/0241971 | A1* | 9/2010 | Zuber .......................... 715/753 |
| 2010/0251142 | A1* | 9/2010 | Geppert et al. .............. 715/758 |
| 2010/0325206 | A1 | 12/2010 | Dayal et al. |
| 2011/0035674 | A1* | 2/2011 | Chenoweth et al. ......... 715/745 |
| 2012/0192086 | A1* | 7/2012 | Ghods et al. ................. 715/753 |

FOREIGN PATENT DOCUMENTS

GB    2368149 A    4/2002
WO    WO 2009/114204 A2    9/2009

* cited by examiner

*Primary Examiner* — Charles Adams

(57) ABSTRACT

A method of enabling collaboration between users of a collaborative Business Intelligence (BI) system comprising pages based on said BI system data, comprising:
displaying a page comprising a view of at least one online analytical processing (OLAP) cube to one of a plurality of users of a BI system;
deducing from semantics of said at least one OLAP cube a relevancy of each of at least some of said plurality of users for a collaboration session with said user;
selecting the most relevant users from said plurality of users for said displayed page according to said deduced relevancy; and
initiating a collaboration session with at least one of said most relevant users.

34 Claims, 9 Drawing Sheets

ENHANCED USAGE OF BUSINESS INTELLIGENCE SYSTEMS

FIELD OF THE INVENTION

The present invention relates generally to electronic business technology and business processes, and more particularly, to a collaborative business intelligence system and method.

BACKGROUND

The major purpose of Business Intelligence (BI) systems is decision support. Users can gain insights into what is actually driving their business. They can measure effectiveness, maximize the ROI (return on investment) and thus maintain competitive advantage. BI systems are key components to an organization's business intelligence infrastructure. OLAP Servers make it easy to get summarized information. OLAP Servers aggregate data at build time and store these aggregations. Aggregations can use a number of different built-in OLAP statistics to aggregate data. Statistics are stored with OLAP cubes and do not require additional computation when accessed by queries.

The short response times of OLAP data sources enable workers to navigate through data following their own train of thought. OLAP clients support the standard OLAP navigations such as:

Drilling up and down hierarchies.
Expanding and collapsing levels within hierarchies.
Slicing and dicing through data.
Drilling beyond the cube data into the underlying detailed data.

It is possible to begin exploring the data by getting a high-level overview on corporate operations. Based on this view, OLAP technology enables fast and consistent drill down access into the details that describe the accumulated business metrics in order to pinpoint key elements and to view business activities from a number of different perspectives. OLAP allows users to be able to analyze data across any dimension, at different levels of aggregation, with equal functionality and ease.

One of the most important purposes of networking, i.e. information sharing is missing in today's BI systems. Users communicate with the system, but not with each other. Another disadvantage of prevailing BI systems is the lack of ability to provide a user with the most relevant data, based not only on his/her previous operations, but also on other users' operations.

Thus there is need for a collaborative BI system to enable users to share viewed data and discuss what they see.

There is also need for a sophisticated relevancy mechanism to provide the users with the most relevant reports.

SUMMARY

According to a first aspect of the present invention there is provided a collaborative Business Intelligence (BI) system comprising pages based on the BI system data, comprising: a system server comprising at least one processing unit, at least one BI related content storage communicating with the at least one processing unit, a collaboration platform communicating with the at least one processing unit, a network interface communicating with the at least one processing unit and a plurality of client computers communicating with the system server over a network, wherein the collaboration platform comprises means for selecting most relevant users and most relevant pages and means for enabling collaboration between users. The system may additionally comprise user interface means configured to display the selected most relevant users and the selected most relevant pages, select at least one of the displayed most relevant pages, display the selected page, select at least one of the displayed most relevant users and initiate a collaboration session with at least one of the displayed most relevant users.

The means for selecting most relevant users and most relevant pages may comprise a page-tags repository, each the page-tags comprising at least keywords, a user-tags repository, each the user-tags comprising at least user's fields of interests, a process-content database configured to store at least one of: discussions pertaining to pages, comments entered in the context of the discussions and action items entered in the context of the discussions, an audit information database configured to store information pertaining to each user and each page, comprising at least one of: opening a page, drilling-down, slicing and contributing to a discussion, a cube semantics module, a relevancy search engine communicating with the page-tags repository, the user-tags repository, the process-content database, the audit information database and the cube semantics module and a ranking module communicating with the relevancy search engine.

The relevancy search engine may be configured to select relevant users for a user, based on at least one of: users having user-tags similar to the user's user-tag, users viewing pages with page-tags similar to the page-tag of a currently displayed page, users viewing pages similar to the currently displayed page and deduction from the semantics of an OLAP cube.

The relevancy search engine may be configured to select relevant pages for a user based on at least one of: a relevancy ranking between the user's user-tag and page-tags, a relevancy ranking between the page-tag of a currently displayed page and page-tags of other pages, a relevancy ranking between the user's user-tag and page-tags of pages currently viewed by other users having similar user-tags, a relevancy ranking between the user's user-tag and at least one item in the process-content database and deduction from the semantics of an OLAP cube.

The ranking module may be configured to receive results from the relevancy search engine, comprising a list of pages, and rank them according to at least one of: tag matching, popularity of usage, OLAP cube semantics and ranking by users.

The ranking module may be configured to receive results from the relevancy search engine, comprising a list of users, and rank them according to at least one of: tag matching, OLAP cube semantics and ranking by users.

The system may be configured to modify a displayed page content according to the user's user-tag.

The system may be configured to display a list of comments pertaining to a displayed page.

The comments may comprise a coordinate-level definition, indicating the hierarchy levels of the page in which the comment should appear.

The system may be configured to receive a selection of a comment from the comment-list, and to modify the displayed page based on the selected comment's coordinate-level definition.

The user interface means for initiating a collaboration session may comprise means for dragging a relevant one or more users' links over a page item to be discussed and for entering discussion thread content to be viewed by the relevant one or more users.

The discussion thread content may comprise a link to a page item in a modified but not saved page.

The discussion thread content may comprise text.

The system may be configured to modify the displayed page based on the link in the discussion thread content.

The system may be configured to modify a displayed page content according to an OLAP cube's semantics.

The system may be configured to modify a next displayed page content by a currently displayed page-tag.

The audit information database may be configured to store information pertaining to each user and each page, comprising at least one of: opening a page, drilling-down, slicing and contributing to a discussion.

The BI related content storage may comprise structured and unstructured data.

The structured data may comprise at least one of an OLAP cube and a relational database.

The unstructured data may comprise at least one of documents, e-mail folders and HTML pages.

According to a second aspect of the present invention there is provided a method of enabling collaboration between users of a Business Intelligence (BI) system comprising pages based on the BI system data, comprising displaying a page, selecting the most relevant users for the displayed page, displaying the selected most relevant users and initiating a collaboration session with at least one of the displayed most relevant users.

Selecting the most relevant users may comprise providing a page-tags repository, each the page-tags comprising at least keywords, providing a user-tags repository, each the user-tags comprising at least user's fields of interests, providing a process-content database comprising at least one of: discussions pertaining to pages, comments entered in the context of the discussions and action items entered in the context of the discussions, providing an audit information database comprising information pertaining to each user and each page, comprising at least one of: opening a page, drilling-down, slicing and contributing to a discussion, providing a cube semantics module, using at least one of the page-tags, the user-tags, the process-content database, the audit information and the cube semantics to select the most relevant users for a user and ranking the selected most relevant users.

The most relevant users may comprise at least one of: users having user-tags similar to the user's user-tag, users viewing pages with page-tags similar to the page-tag of a currently displayed page, users viewing pages similar to the currently displayed page and deduction from the semantics of an OLAP cube.

Ranking may comprise receiving the selected most relevant users and ranking them according to at least one of: tag matching, OLAP cube semantics and ranking by users.

Displaying a page may comprise modifying the page content according to the user's user-tag.

Displaying a page may comprise displaying a list of comments pertaining to the displayed page.

The comments may comprise a coordinate-level definition, indicating the hierarchy levels of the page in which the comment should appear.

The method may additionally comprise selecting a comment from the comment-list, whereby the displayed page is modified based on the selected comment's coordinate-level definition.

Initiating a collaboration session may comprise dragging the most relevant one or more users' links over a page item to be discussed and entering discussion thread content to be viewed by the most relevant users.

The discussion thread content may comprise a link to a page item in a modified but not saved report.

The discussion thread content may comprise text.

The method may comprise modifying the displayed page based on the link in the discussion thread content.

The method may comprise modifying the displayed page according to OLAP cube semantics.

According to a third aspect of the present invention there is provided a method of providing the most relevant content to a user of a Business Intelligence (BI) system comprising pages based on the BI system data, comprising: providing a page-tags repository, each the page-tags comprising at least keywords, providing a user-tags repository, each the user-tags comprising at least user's fields of interests, providing a process-content database comprising at least one of: discussions pertaining to pages, comments entered in the context of the discussions and action items entered in the context of the discussions, providing an audit information database comprising information pertaining to each user and each page, comprising at least one of: opening a page, drilling-down, slicing and contributing to a discussion, providing a cube semantics module, using at least one of the page-tags, the user-tags, the process-content database, the audit information and the cube semantics to select the most relevant pages for a user and ranking the selected most relevant pages.

Providing the most relevant content may comprise selecting relevant pages for a user based on at least one of: a relevancy ranking between the user's user-tag and page-tags, a relevancy ranking between the page-tag of a currently displayed page and page-tags of other pages, a relevancy ranking between the user's user-tag and page-tags of pages currently viewed by other users having similar user-tags, a relevancy ranking between the user's user-tag and at least one item in the process-content database and deduction from the semantics of an OLAP.

Ranking may comprise receiving the selected most relevant pages and ranking them according to at least one of: tag matching, popularity of usage, OLAP cube semantics and ranking by users.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
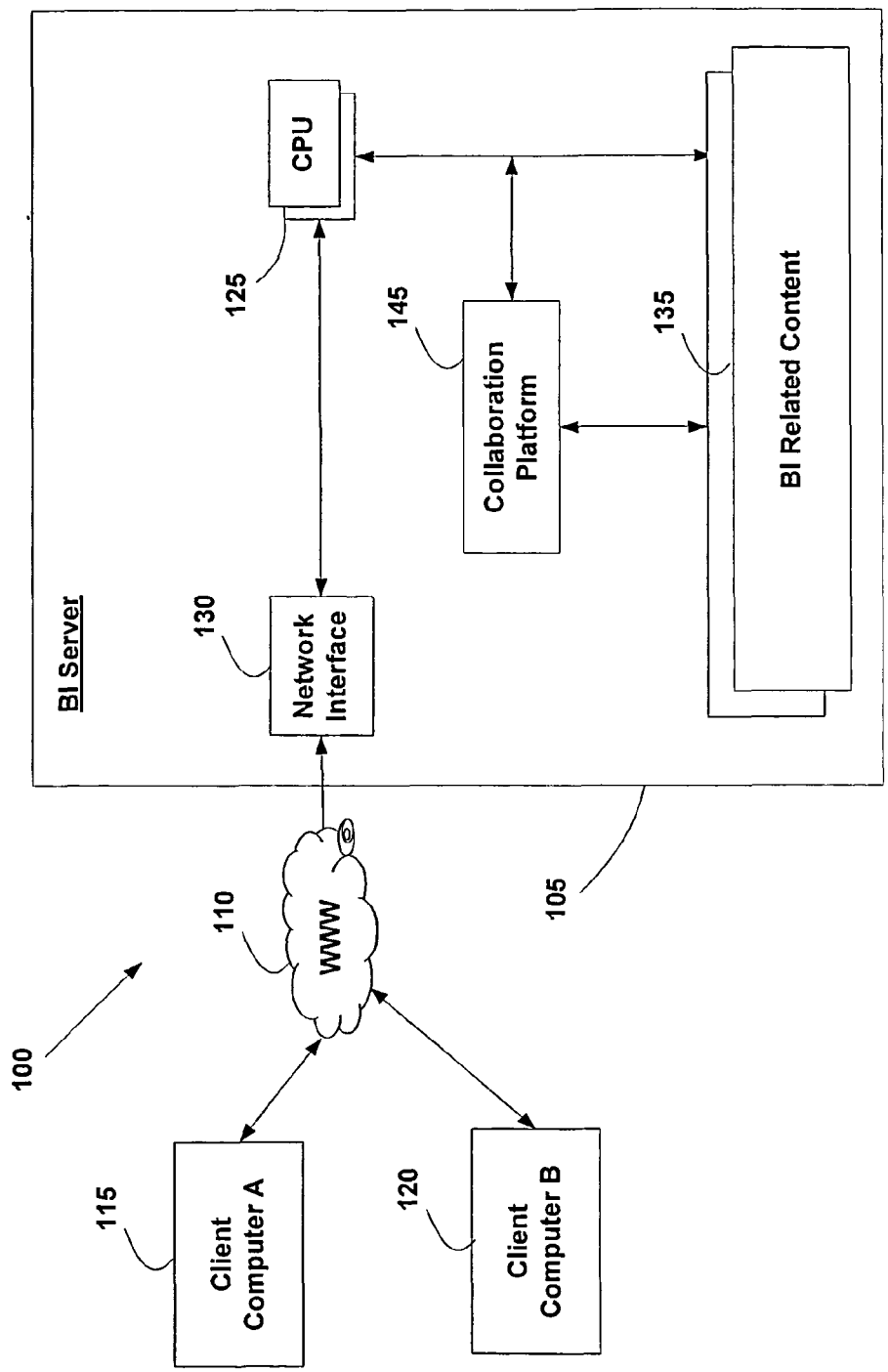
FIG. 1 is a schematic block diagram of the system components according to the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

In the following detailed description, numerous specific details are set forth regarding the system and method and the environment in which the system and method may operate, etc., in order to provide a thorough understanding of the present invention. It will be apparent, however, to one skilled in the art that the present invention may be practiced without such specific details. In other instances, well-known components, structures and techniques have not been shown in detail to avoid unnecessarily obscuring the subject matter of the present invention. Moreover, various examples are provided to explain the operation of the present invention. It should be understood that these examples are exemplary. It is contemplated that there are other methods and systems that are within the scope of the present invention.

The method of the present invention, as incorporated in a computer program, may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus. In addition, embodiments of the present invention are not described with reference to any particular programming language. It will be appreciated that a variety of programming languages may be used to implement the teachings of the inventions as described herein. The subject-matter of the present invention can be implemented on one or more computer program products, i.e. one or more computer programs tangibly embodied in a non-transitory media, e.g. in a machine storage device, for execution by, or to control the operation of, data processing apparatus, e.g. a programmable processor, a computer or multiple computers.

At least some of the subject matter described herein may be implemented in a computing system that includes a back-end component (e.g. a data server), a middleware component (e.g. an application server) or a front-end component (e.g. a client computer having a graphical user interface or a web browser through which a user can interact with an implementation of the subject matter described herein), or any combination of such back-end, middleware and front-end components. The components of the system can be interconnected by any form or medium of digital data communication, e.g. a communication network. Examples of communication networks include a local area network (LAN) and a wide area network (WAN), e.g. the Internet.

The system may include clients and servers. A client and a server are generally remote from each other in a logical sense and typically interact through a communication network. The relationship of client and server may arise by virtue of computer programs running on the respective computers and having a client-server relationship to each other.

The present invention provides a system and methods for enhancing the usage of Business Intelligence (BI) systems by providing three main components:

A ranking module;
A relevancy module;
A collaboration platform.

The enhanced usage according to the present invention enables;

Collaboration between users of the BI system for the purpose of discussing data items and/or mentoring new users to the system;

Providing the most relevant pages to a user;

Providing the most relevant users for collaboration purposes to a user viewing a page;

Automatically modifying content of pages viewed by a user according to the user's preferences (explicit or implicit) and/or according to deduction from the OLAP cube semantics.

FIG. 1 is a schematic block diagram of the system components according to the present invention.

The system 100 comprises a BI server 105, communicating over the internet 110 with a plurality of client computers (115, 120).

BI server 105 comprises one or more central processors 125 communicating bi-directionally with the network interface 130.

BI server 105 additionally comprises one or more BI related content storages 135 and a collaboration platform 145, as will be explained in details below.

Figure 2:
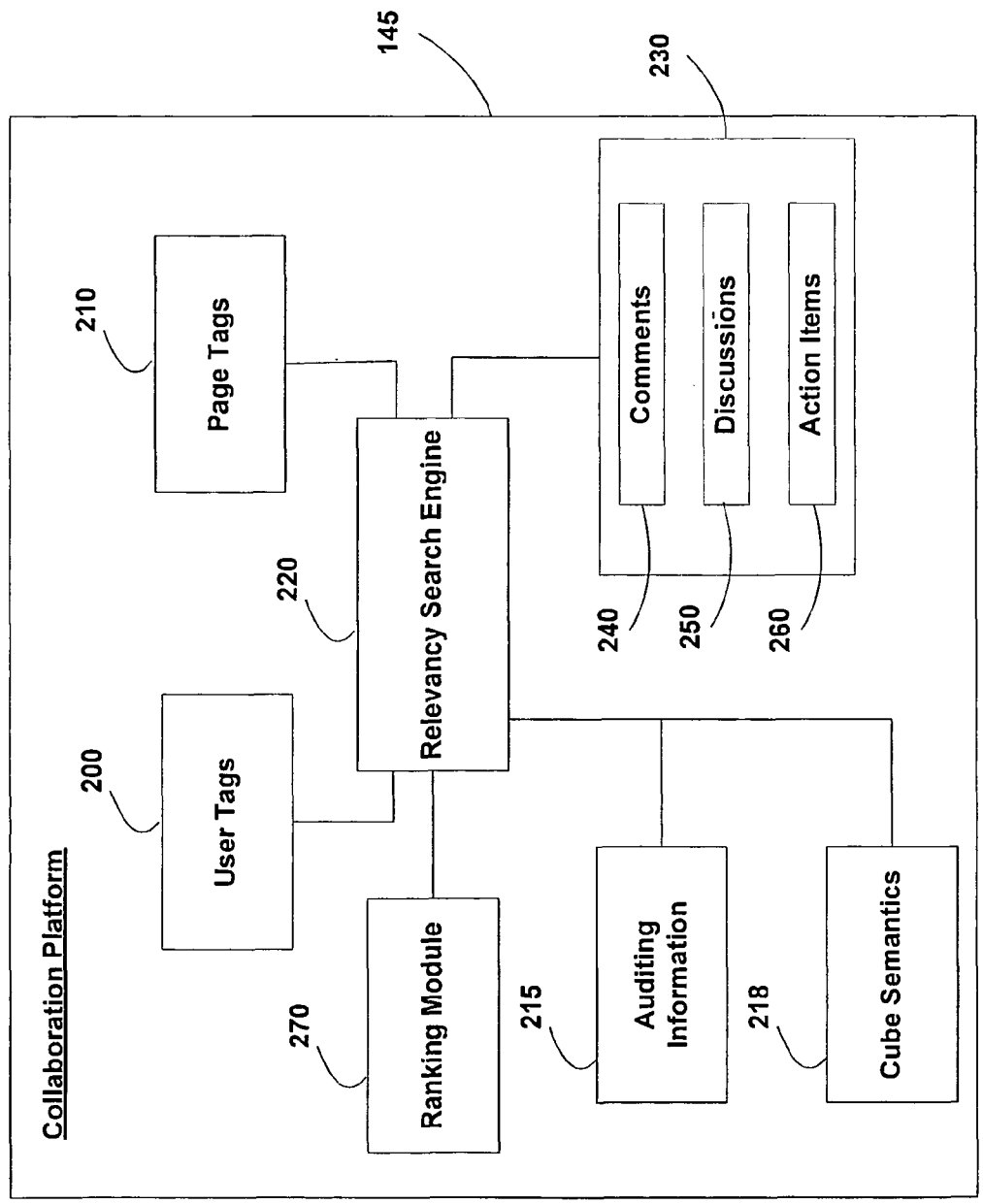
FIG. 2 is a schematic block diagram of the collaboration platform of FIG. 1.

FIG. 2 is a schematic block diagram of the collaboration platform 145 of FIG. 1. Collaboration platform 145 comprises a relevancy search engine 220, user-tags 200, page-tags 210, auditing information 215 and a process-content database 230 including at least discussions 250 pertaining to page items, comments 240 entered in the context of said discussions and action items 260 entered in the context of said discussions, to search for the most relevant pages and/or users, as will be explained in details below. Relevancy search engine 220 communicates the search results to the ranking module 270.

Figure 3:
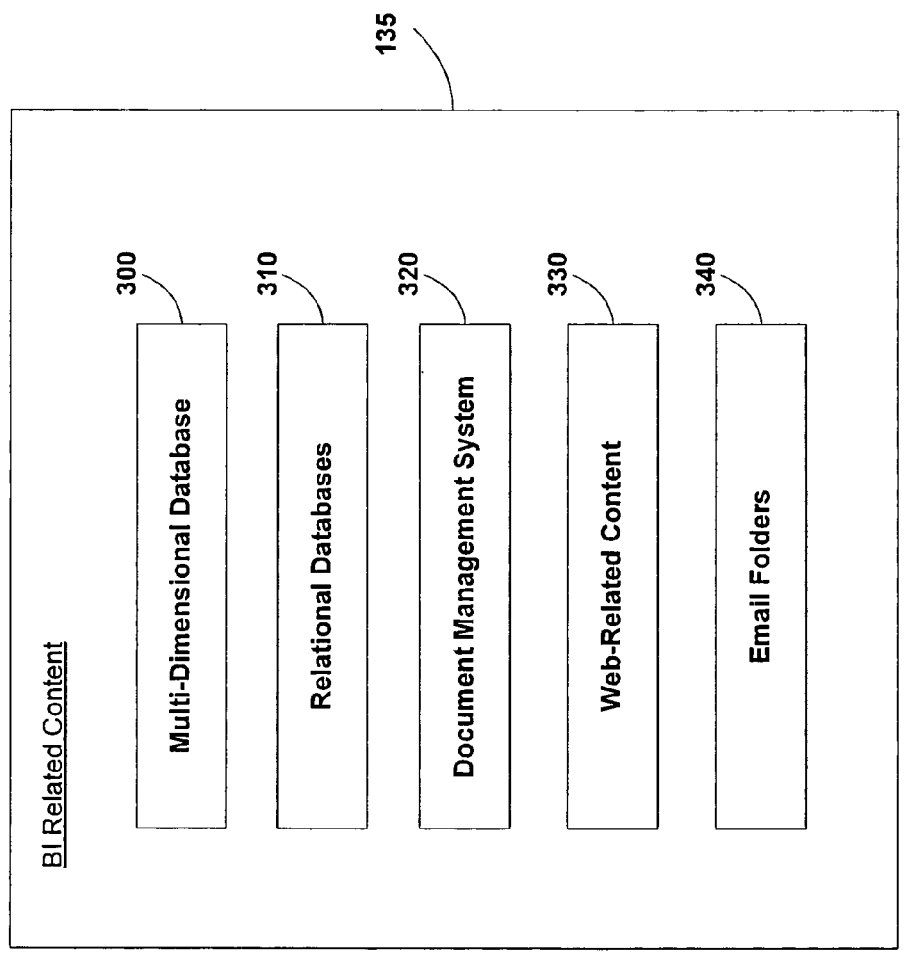
FIG. 3 is a schematic block diagram of the BI related content storage of FIG. 1.

FIG. 3 is a schematic block diagram of the BI related content storage 135 of FIG. 1. Storage 135 may store any, some or all of the following organization's data types:

Structured data, such as an OLAP cube 300 and/or relational databases 310 and applications (e.g. ERP);

Unstructured data, such as documents (Word, Excel) 320 and/or e-mail folders 340;

Web-related content 330, such as HTML pages.

The various components of the collaboration platform 145 will now be explained in detail:

User-tags (200)—A user-tag is an entity indicating the user's fields of interest such as a product name and/or a geographic area relevant to the user. The user-tag may be created and/or modified manually by the user, e.g. by being provided with a special form for indicating his fields of interest. Alternatively, in systems comprising an OLAP cube, the user-tag may be created automatically by the system from metadata deduced from the cube's semantics, e.g. if the user is in charge of the sales of mountain bicycles in Washington state, both the product mountain bicycles and the area Washington state may be automatically added to his user-tag.

Page-taps (210)—A page, in the context of the present invention, comprises one or more BI entities displayed simultaneously to the user. The page entities may comprise, for example, OLAP cube views, relational database tables, documents (Word, XL), HTML pages (e.g. a news portals, Google, Twitter, Bing, Facebook, etc.) pertaining to the organization's activities. A page may comprise any combination of these entities.

A page-tag is an entity indicating the page's content, e.g. keywords. The page-tag may be created and/or modified manually by the creator of the page, e.g. by being provided with a special form for indicating keywords of the page. Alternatively, in systems comprising an OLAP cube, the page-tag may be created automatically by the system from metadata deduced from the cube's semantics such as, for example, the members the page is currently sliced on, or the list of geographical areas analyzed by the page.

Process-content database (230)—The process-content database stores various components pertaining to pages viewed by users of the system. The components may be, but are not limited to:

Comments (240) entered by one or more user regarding all or part of a page content. If the BI system comprises a multi-dimensional database, a comment may include a coordinate cell definition, or coordinate member definition indicating the cell\member the comment is attached to.

Discussions (250) conducted between at least two users regarding selected items of a page, as will be explained in details below;

Action items (260) pertaining to selected page items, entered by one or more participants in the course of a discussion.

The process-content database components comprise links to the relevant pages and page items.

Auditing Information (215)—The auditing information module stores information pertaining to each user and each page, such as opening a page, drill-down, slice, contributing to a discussion etc.

Relevancy Search Engine (220)—The relevancy search engine uses user-tags 200, page-tags 210, auditing information 215, process-content database 230 and cube semantics 218 to search for the most relevant pages and/or users to be displayed. The auditing information can be filtered between dates, e.g. all operations from last month Ranking Module (270)—The ranking module receives results from the relevancy search engine, comprising a list of pages or a list of users, and ranks them in a descending order according to their relevancy number. The relevancy number is calculated from any or a weighted combination of:

Tag matching;
Popularity and usage (from auditing);
Deduction from page BI content—cube semantics that is relevant to the user;
"Liked" or ranked by users.

The weights may be automatically modified according to usage.

Figure 4:
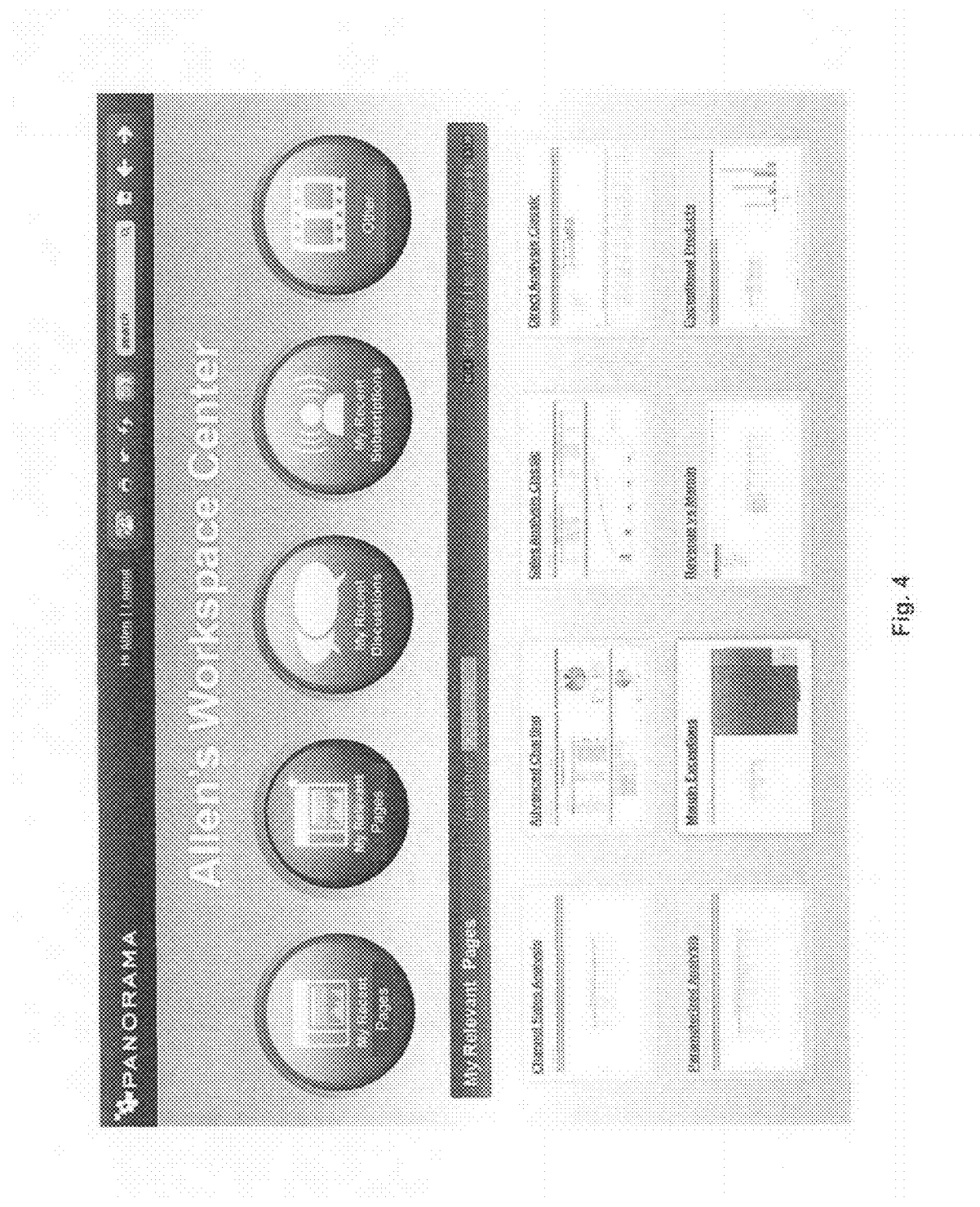
FIG. 4 is a schematic home-page user interface.

The collaboration platform 145 described above enables the system to present the user, upon entering the BI application, with various entities which may facilitate his selection of the next action to be performed, as exemplified in FIG. 4.

The exemplary entities shown in FIG. 4 are:

My recent pages—the most recent pages viewed by User1;

My relevant pages—the most relevant pages for User1 as selected by the collaboration platform, according to at least one of the following:
  a relevancy ranking between User1's user-tag and page-tags of pages currently viewed by other users having similar user-tags;
  a relevancy ranking between User1's user-tag and at least one item in the process-content database, e.g. another user has initiated a discussion and has invited User1 to participate in the discussion;
  based on an OLAP cube semantics.
  dates range My recent discussions—the most recent discussions in which User1 is participating, either as initiator or as an invited party;

My recent subscriptions—the most recent pages viewed by users to which User1 has requested to subscribe (follow);

Other—Various other relevant entities such as, for example:
Direct events:
  messages directed at User1 from other users subscribed to him;
  messages directed at User1 from other users without subscription;
  content saved by another user which is relevant to User1 according to the OLAP cube semantics, etc.
Indirect events:
  User1 name is entered as part of a discussion
  words translated by the system into meaningful terms that are of interest to User1 were entered as part of a discussion not shared by User1.

Discussion can be either:
1. Shared only between the selected group of users
2. Shared only by the selected group, but other users may join the discussion if they are notified of its existence. They will be notified by the above mechanism.

When the user selects one of the entities he is presented, for example, with a display of page thumbnails or discussion thumbnails from which he may select the page or discussion to view.

A collaboration scenario according to the present invention will now be described.

Usage Scenario—Collaboration

Figure 5A:
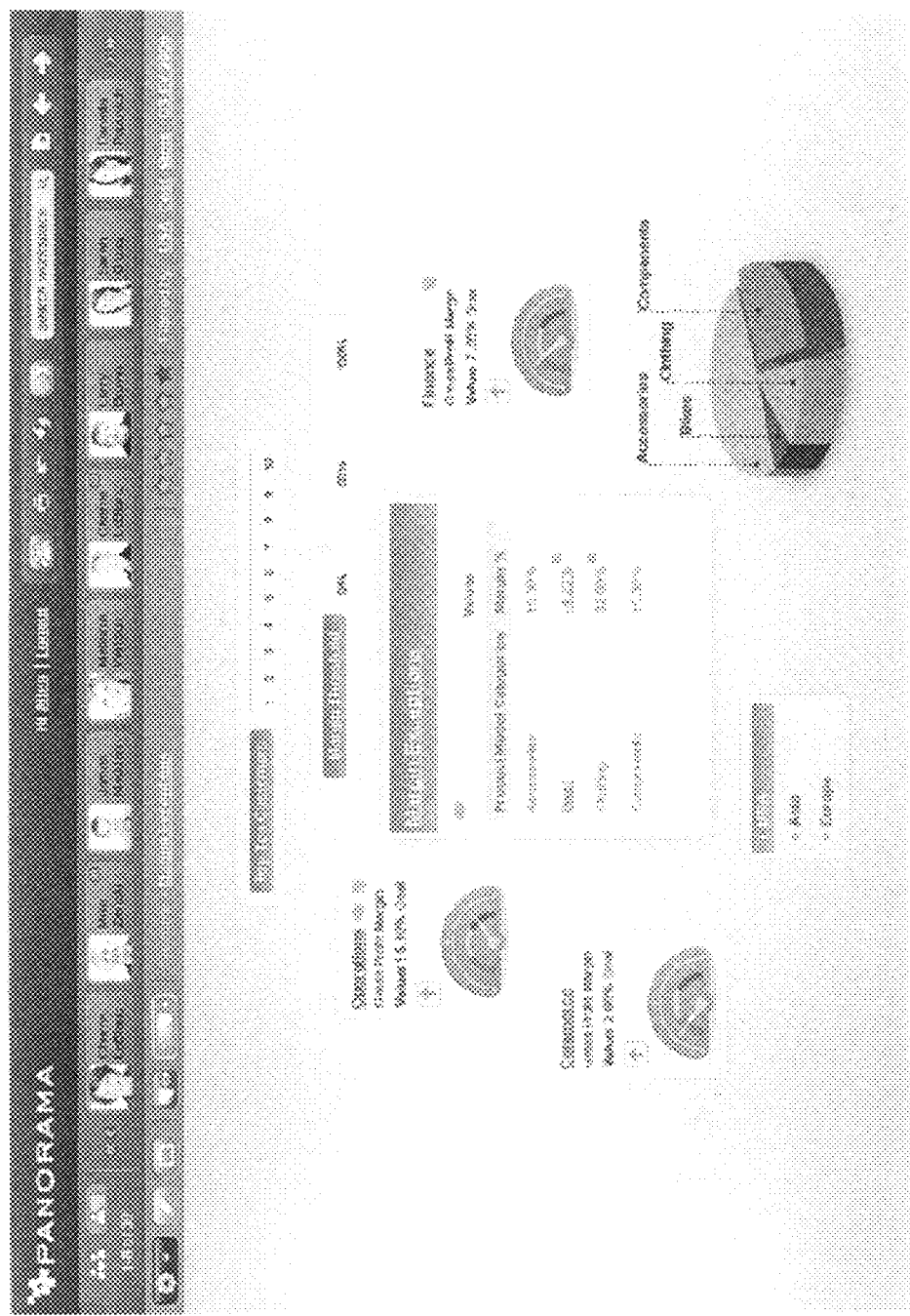
FIGS. 5A through 5C show an exemplary graphical user interface for initiating a discussion
Figure 5B:
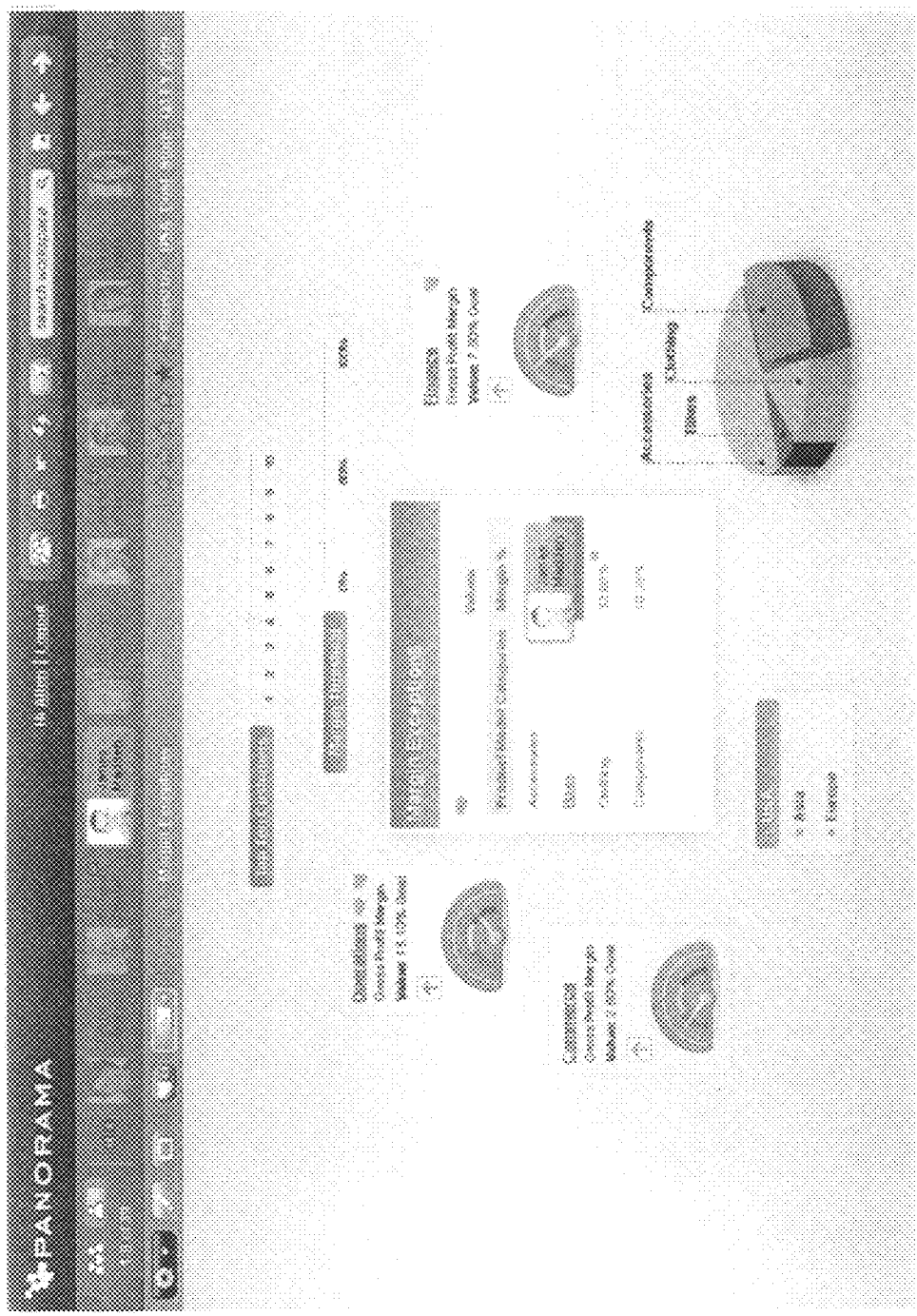
Figure 5C:
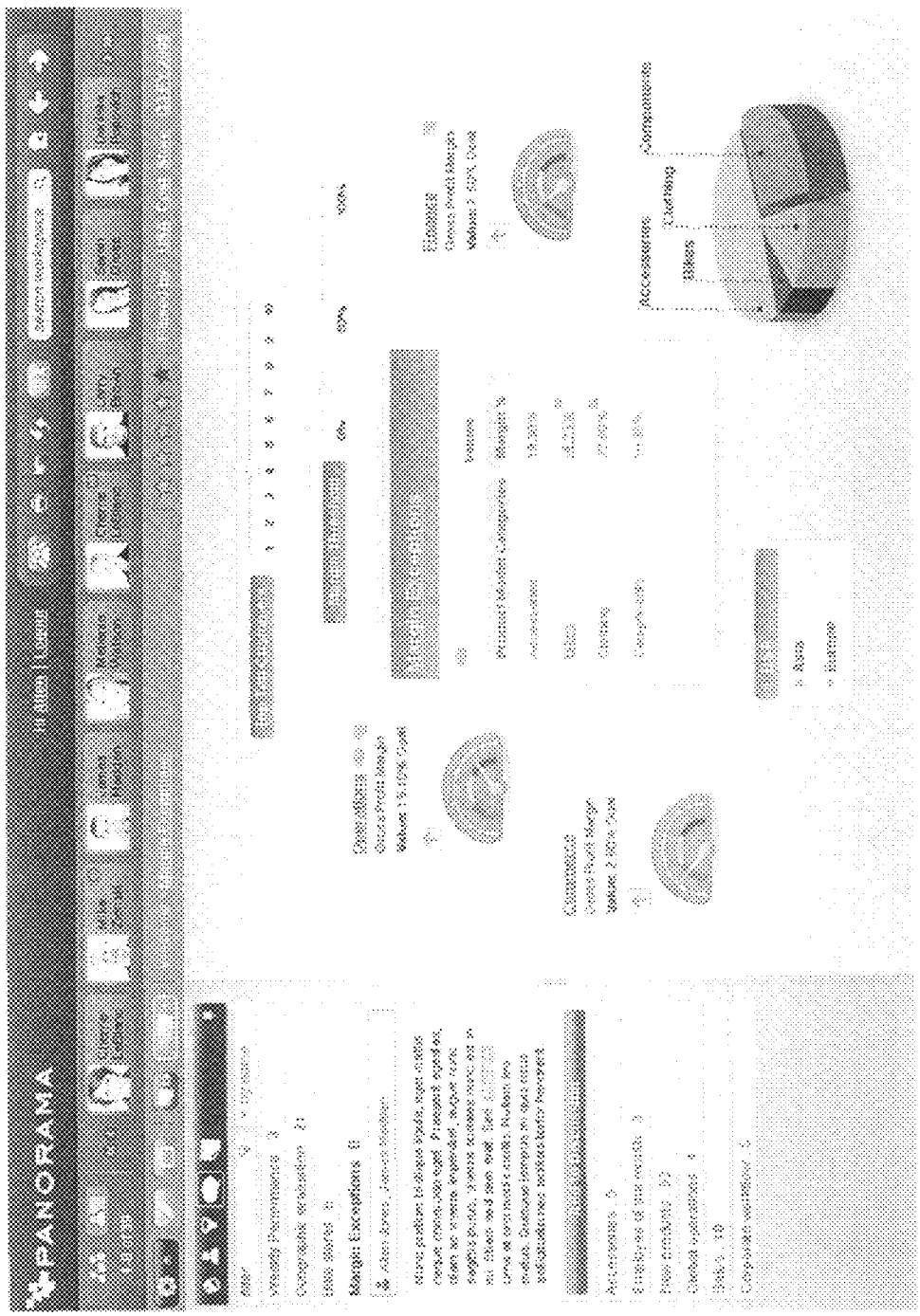

FIGS. 5A through 5C show an exemplary graphical user interface for initiating a discussion according to the present invention.

Figure 6:
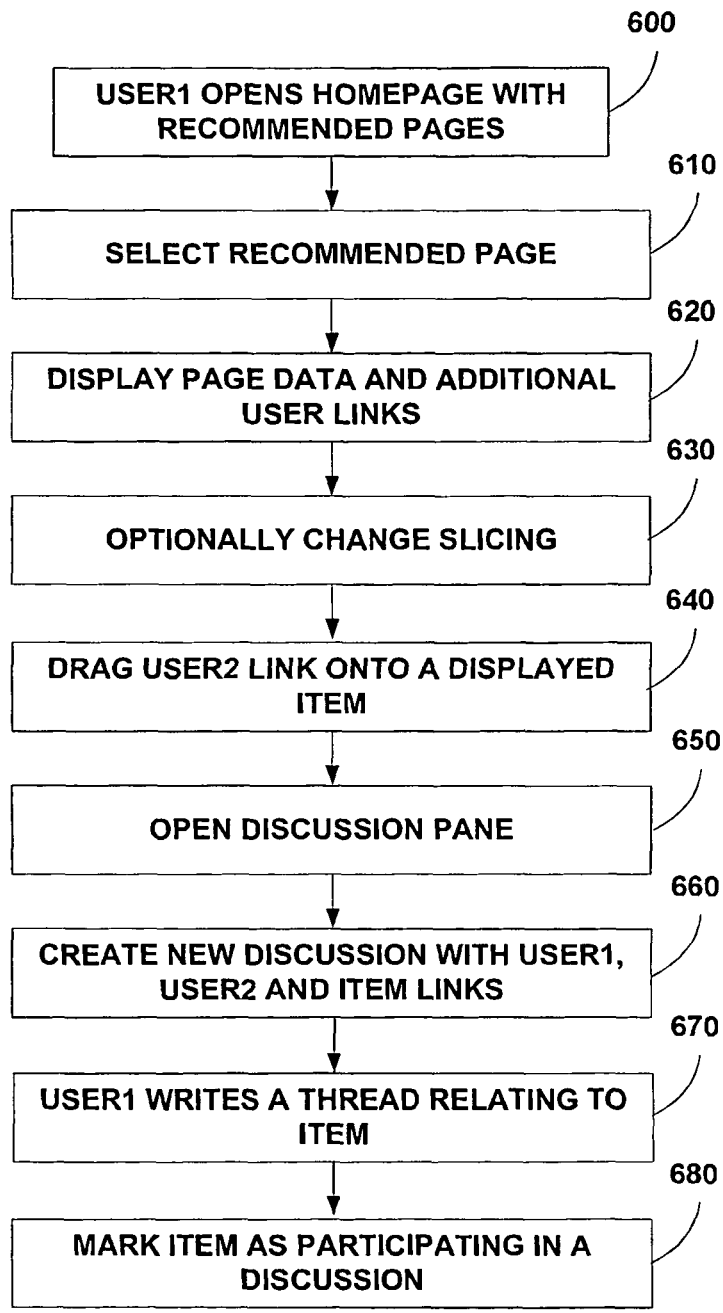
FIG. 6 is a flowchart describing the initiation of a new discussion.
Figure 7:
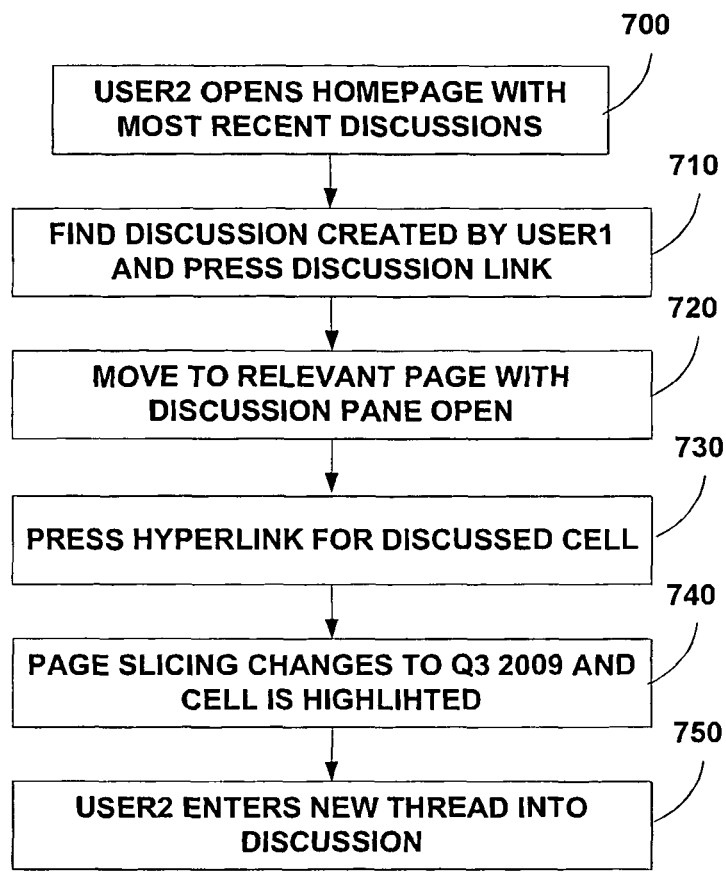
FIG. 7 is a flowchart describing participation in a discussion.

FIGS. 6 and 7 are flowcharts describing the collaboration process according to the present invention.

In FIG. 6, a new discussion is initiated as follows:

In step 600, User1 opens his BI application homepage and selects "My relevant Pages", whereby the system presents him with the most relevant pages to be viewed, ranked in descending order of relevancy. The most relevant pages for User1 are selected by the relevancy search engine 220 according to at least one of the following:
  a relevancy ranking between User1's user-tag and page-tags of pages currently viewed by other users having similar user-tags;
  a relevancy ranking between User1's user-tag and at least one item in the process-content database, e.g. another user has initiated a discussion and has invited User1 to participate in the discussion;
popularity and usage (from audit);
based on OLAP cube semantics.

In step 610, User1 selects a page from the recommended pages list to be displayed.

In step 620, the selected page is displayed, as depicted in FIG. 5A, along with additional user links, such as, for example:

The most relevant users for the displayed page, ranked in descending order of relevancy by the relevancy search engine 220 and the ranking module 270. The most relevant users for a page displayed to User1 are selected by the relevancy search engine 220 according to at least one of the following:
Users who have viewed the current page
users having similar user-tags;
users who have viewed similar pages to pages viewed by User1;
multi-dimensional database semantics:
deduce users from current page data.
Users previously defined by User1 as "Friends" or to which the user has previously requested to "Subscribe" (follow).

The user links may be displayed as lists or as thumbnail pictures or any combination therebetween.

In one embodiment, if the displayed page comprises comments, User1 may select a comment from the page's comments-list, whereby the displayed page is modified based on the selected comment's coordinate-level definition.

In another embodiment, the displayed page content may be modified by the system prior to displaying the page to User1. The modification may be done according to User1's fields of interest defined in his user-tag, either explicitly (as entered by User1) or implicitly (as deduced by the system) and/or according to deduction from the OLAP cube semantics. For example, if User1 is the sales manager for mountain bicycles in the area of Washington state, as deduced from the OLAP cube, or if User1 has defined Washington state as a field of interest in his user-tag, the system may project this information on pages viewed by User1 by, for example, overriding his request to display a page pertaining to the state of California and showing him instead the same page as pertaining to Washington state.

In step 630, if the displayed page is a table created from an OLAP cube, User1 may now change the slicing. For example, if the displayed page contained sales data for the entire year 2009, User1 may wish to see sales data for Q3 2009.

In step 640, if User1 wishes to discuss a certain item in the displayed page with another user (User2), he may select User2 from the user links provided, as depicted in FIG. 5B. User1 drags User2's link over the item (Item1) he wishes to discuss, which may be, for example, a cell in a table, a pie-chart, a document, or an HTML page.

In step 650, a discussion pane is opened, showing all the existing discussions pertaining to the displayed page in which the user participates.

In step 660 a new discussion is created in the discussion pane, as depicted in FIG. 5C, comprising User1 link, User2 link and a hyperlink to Item1. When the hyperlink to Item1 is pressed, the displayed page may change in order to show the number referred to in the discussion—sometimes this will require changing in slicing, drill down etc.

In step 670, User1 writes a thread relating to Item1. The thread may comprise any free text observations, questions and/or action items.

In step 680 Item1 is marked as an item participating in a discussion.

In FIG. 7, a user (User2) participates in a discussion to which he has been invited.

In step 700, User2 opens his BI application homepage and selects "My Recent Discussions", whereby the system presents him with the most recent discussions in which he is participating, either as an initiator or as an invited participant. The most recent discussions for User2 are selected by the relevancy search engine 220.

In step 710, User2 finds the discussion created by User1 (in FIG. 6) and presses the discussion link.

In step 720, the system displays to User2 the relevant page for the discussion and the discussion pane is opened, showing the text entered by User1.

In step 730 User2 presses the link for the discussed item in the discussion pane.

In step 740, if user1 has changed the slicing as described above in conjunction with FIG. 6, the page displayed to User2 undergoes the same slicing. For example, If data displayed to User2 is now sliced on January 15 and the link refers to January 7, User2's data will change to the data associated with the link (January 7). Moreover, if User2's data is sliced on January, the values will change to reflect January value as of January 7.

The discussed item (Item1) is highlighted.

In step 750, User2 enters a new thread pertaining to Item1 into the discussion pane. The thread may comprise any free text observations, questions, responses and/or action items.

User2 may invite another User to participate in the discussion and/or select another item on the same page or on another page to start a new discussion.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof which would occur to persons skilled in the art upon reading the foregoing description.

The invention claimed is:

1. A collaborative Business Intelligence (BI) system comprising pages based on said BI system data, comprising:
at least one processing unit;
at least one BI related content storage communicating with said at least one processing unit for storing an online analytical processing (OLAP) database;
a user interface which allows displaying a page comprising a view of at least one OLAP cube from said OLAP database to a user of a plurality of users of the BI system;
an OLAP semantics module adapted to deduce automatically from semantics analysis of user data in said at least one OLAP cube an implicit relevancy of each of at least some of said plurality of users for a collaboration session about said at least one OLAP cube with said user;
a relevancy search engine which selects the most relevant users from said plurality of users for said displayed page according to a relevancy number and according to user data of each of said plurality of users, said user data comprises a member of a group consisting of: user fields of interests, user discussions pertaining to said page, and user comments entered in the context of said page, wherein said relevancy number is calculated according to a weighted combination of at least tag matching, usage of said displayed page, said implicit relevancy and user ranking of said displayed page; and a collaboration platform communicating with said at least one processing unit for presenting a new discussion indication in a discussion pane and initiating said collaboration session about said at least one OLAP cube between said user and at least one of said most relevant users in response to a user input; and a network interface communicating with said at least one processing unit.

2. The system of claim 1, wherein said relevancy search engine comprises:
providing a page-tags repository hosting a plurality of page-tags, each one of said plurality of page-tags comprising at least keywords;
a user-tags repository hosting a plurality of user-tags, each one of said plurality of user-tags comprising at least one field of interest of one of said plurality of users;
a process-content database comprising at least one of: a plurality of discussions held by said plurality of users pertaining to pages, comments entered in the context of said discussions and action items entered in the context of said discussions;
an audit information database comprising information pertaining to each user of said plurality of users and each page, comprising at least one of: opening a page, drilling-down, slicing and contributing to a discussion from said plurality of discussions;
an OLAP cube semantics module which performs said deducing;
wherein said relevancy search engine communicates with said page-tags repository, said user-tags repository, said process-content database, said audit information database and said cube semantics module; and
a ranking module communicating with said relevancy search engine selected most relevant users.

3. The system of claim 1, said OLAP semantics module which deduces said relevancy by identifying on at least one of: users having user-tags similar to at least one user-tag of said user, users viewing pages with page-tags similar to at least one page-tag of the currently displayed page, and users viewing pages similar to said currently displayed page.

4. The system of claim 2, wherein said relevancy search engine is configured to select relevant pages for the user based on at least one of: a relevancy ranking between the user-tag of said user and page-tags of said page, a relevancy ranking between the page-tag of a currently displayed page and page-tags of other pages, a relevancy ranking between the user's user-tag and page-tags of pages currently viewed by other users having similar user-tags, a relevancy ranking between the user's user-tag and at least one item in said process-content database and a deduction from the semantics of data in said at least one OLAP cube.

5. The system of claim 2, wherein said ranking module is configured to receive results from the relevancy search engine, comprising a list of pages, and rank them according to at least one of: tag matching, popularity of usage, OLAP cube semantics and ranking by users.

6. The system of claim 2, wherein said ranking module is configured to receive results from the relevancy search engine, comprising a list of users, and rank them according to at least one of: tag matching, data of OLAP cube semantics and ranking by users.

7. The system of claim 2, said system configured to modify a displayed page content according to at least one user-tag from said plurality of user-tags which is related to said user.

8. The system of claim 1, said system configured to display a list of comments pertaining to a displayed page.

9. The system of claim 8, said system configured to receive a selection of a comment from said comment-list, and to modify said displayed page based on said selected comment's coordinate-level definition.

10. The system of claim 1, wherein said user input is performed by said user dragging a relevant one or more users' links over a page item to be discussed and for entering discussion thread content to be viewed by said relevant one or more users.

11. The system of claim 10, wherein said discussion thread content comprises a link to a page item in a modified but not saved page.

12. The system of claim 10, wherein said discussion thread content comprises text.

13. The system of claim 10, said system configured to modify said displayed page based on a link in a discussion thread content comprising at least one of free text observations, questions, responses and action items made in association with said page by at least some of said plurality of users.

14. The system of claim 1, said system configured to modify a displayed page content according to semantics of said data in said at least one OLAP cube.

15. The system of claim 2, said system configured to modify a next displayed page content by a currently displayed page-tag.

16. The system of claim 2, wherein said audit information database is configured to store information pertaining to each user and each page, comprising at least one of: opening a page, drilling-down, slicing and contributing to a discussion.

17. The system of claim 1, wherein said BI related content storage comprises structured and unstructured data.

18. The system of claim 17, wherein said structured data comprises at least one of an OLAP cube and a relational database.

19. The system of claim 17, wherein said unstructured data comprises at least one of documents, e-mail folders and HTML pages.

20. The system of claim 1, wherein said collaboration platform is configured to instruct a display of said view of at least one OLAP cube on a first client device of said user and on a display of at least one second client of said at least one most relevant user during said collaboration session about said at least one OLAP cube.

21. A non-transitory computer storage medium tangibly embodying a program of machine-readable instructions executable by a digital processing apparatus to perform the method of enabling collaboration between users of a Business Intelligence (BI) system comprising pages based on said BI system data, comprising:
displaying a page comprising a view of at least one online analytical processing (OLAP) cube to a user of a plurality of users of a BI system;
automatically deducing from semantics analysis of user data in said at least one OLAP cube an implicit relevancy of each of at least some of said plurality of users for a collaboration session about said at least one OLAP cube with said user;
selecting the most relevant users from said plurality of users for said displayed page according to a relevancy number and according to user data of each of said plurality of users, said user data comprises a member of a group consisting of: user fields of interests, user discussions pertaining to said page, and user comments entered in the context of said page, wherein said relevancy number is calculated according to a weighted combination of at least tag matching, usage of said displayed page, said implicit relevancy and user ranking of said displayed page; and presenting a new discussion indication in a discussion pane; and initiating said collaboration session about said at least one OLAP cube with at least one of said most relevant users in response to a user input.

22. A method of enabling collaboration between users of a Business Intelligence (BI) system comprising pages based on said BI system data, comprising:

displaying a page comprising a view of at least one online analytical processing (OLAP) cube to one of a plurality of users of a BI system;

automatically deducing from semantics analysis of user data in said at least one OLAP cube an implicit relevancy of each of at least some of said plurality of users for a collaboration session about said at least one OLAP cube with said user;

selecting the most relevant users from said plurality of users for said displayed page according to a relevancy number and according to user data of each of said plurality of users, said user data comprises a member of a group consisting of: user fields of interests, user discussions pertaining to said page, and user comments entered in the context of said page, wherein said relevancy number is calculated according to a weighted combination of at least tag matching, usage of said displayed page, said implicit relevancy and user ranking of said displayed page; and presenting a new discussion indication in a discussion pane;

initiating said collaboration session about said at least one OLAP cube with at least one of said most relevant users in response to a user input.

23. The method of claim 22, wherein said selecting the most relevant users comprises:

providing a page-tags repository hosting a plurality of page-tags, each said page-tags comprising at least keywords;

providing a user-tags repository hosting a plurality of user-tags, each said user-tags comprising at least user's fields of interests;

providing a process-content database comprising at least one of: a plurality of discussions held by said plurality of users pertaining to pages, comments entered in the context of said discussions and action items entered in the context of said discussions;

providing an audit information database comprising information pertaining to each user of said plurality of users and each page, comprising at least one of: opening a page, drilling-down, slicing and contributing to a discussion from said plurality of discussions;

providing an OLAP cube semantics module which performs said deducing;

using at least one of said page-tags, said user-tags, said process-content database, said audit information and semantics analysis of said at least one OLAP cube to select the most relevant users for the collaboration session about said at least one OLAP cube with the user; and ranking said selected most relevant users.

24. The method of claim 23, wherein said most relevant users comprise at least one of: users having user-tags similar to at least one user-tag of said user, users viewing pages with page-tags similar to at least one page-tag of said currently displayed page, users viewing pages similar to said currently displayed page and a deduction from the semantics of an OLAP cube.

25. The method of claim 23, wherein said ranking comprises receiving said selected most relevant users and ranking them according to at least one of: tag matching, semantics analysis of data in an OLAP cube of pages similar to said page and ranking by at least some of said plurality of users.

26. The method of claim 23, wherein said displaying a page comprises modifying said page content according to at least one user-tag from said plurality of user-tags which is associated with said user.

27. The method of claim 22, wherein said displaying a page comprises displaying a list of comments pertaining to the displayed page from said plurality of users.

28. The method of claim 27, wherein said comments comprise a coordinate-level definition, indicating the hierarchy levels of the page in which the comment should appear.

29. The method of claim 28, additionally comprising selecting a comment from said comment-list, whereby said displayed page is modified based on said selected comment's coordinate-level definition.

30. The method of claim 22, wherein said initiating a collaboration session comprises dragging one or more links of said most relevant users over a page item to be discussed and entering discussion thread content to be viewed by said most relevant users.

31. The method of claim 30, wherein said discussion thread content comprises a link to a page item in a modified but not saved report.

32. The method of claim 30, wherein said discussion thread content comprises text.

33. The method of claim 31, comprising modifying said displayed page based on said link in said discussion thread content.

34. The method of claim 31, comprising modifying said displayed page according to semantics analysis of data in said at least one OLAP cube.

* * * * *